(12) United States Patent
Lee et al.

(10) Patent No.: US 6,705,911 B2
(45) Date of Patent: Mar. 16, 2004

(54) METHOD FOR FABRICATING FLAT FLUORESCENT LAMP

(75) Inventors: Yoon-jung Lee, Seoul (KR); Seoung-jae Im, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/082,076

(22) Filed: Feb. 26, 2002

(65) Prior Publication Data

US 2002/0187708 A1 Dec. 12, 2002

(30) Foreign Application Priority Data

Mar. 6, 2001 (KR) ........................................ 2001-11472

(51) Int. Cl.[7] ................................................. H01J 9/02
(52) U.S. Cl. ........................ 445/24; 313/482; 313/496; 427/68
(58) Field of Search ........................... 445/24; 313/482, 313/496; 427/66, 68

(56) References Cited

U.S. PATENT DOCUMENTS

| | | | | |
|---|---|---|---|---|
| 3,936,930 A | * | 2/1976 | Stern | 445/24 |
| 5,289,081 A | * | 2/1994 | Tamatani et al. | 313/486 |
| 5,352,478 A | * | 10/1994 | Miyake et al. | 427/68 |
| 5,509,841 A | | 4/1996 | Winsor | |
| 5,708,324 A | | 1/1998 | Anandan et al. | |
| 5,909,083 A | * | 6/1999 | Asano et al. | 445/24 |
| 5,984,747 A | * | 11/1999 | Bhagavatula et al. | 445/24 |
| 6,039,622 A | * | 3/2000 | Kosaka et al. | 445/24 |
| 6,100,635 A | | 8/2000 | Winsor | |
| 6,194,826 B1 | * | 2/2001 | Satou et al. | 445/24 |
| 6,232,024 B1 | * | 5/2001 | Kimura et al. | 427/68 |
| 6,391,504 B2 | * | 5/2002 | Tai et al. | 445/24 |
| 6,544,090 B1 | * | 4/2003 | Anderson et al. | 445/24 |
| 6,585,912 B2 | * | 7/2003 | Matsuda et al. | 313/486 |

* cited by examiner

Primary Examiner—P. Austin Bradley
Assistant Examiner—Briggitte R. Hammond
(74) Attorney, Agent, or Firm—Burns Doane Swecker & Mathis, LLP

(57) ABSTRACT

A method for manufacturing a flat fluorescent lamp is provided. The method involves: preparing a transparent front plate; preparing a transparent back plate facing the front plate, the back plate having a plurality of discharging electrodes thereon and a dielectric layer covering the discharging electrodes; forming a plurality of spacers between the front plate and the back plate to keep a separation gap therebetween; and forming a fluorescent layer by spraying phosphor slurry on one surface of at least one of the front plate and the back plate.

4 Claims, 2 Drawing Sheets

METHOD FOR FABRICATING FLAT FLUORESCENT LAMP

Priority is claimed to Patent Application Number 2001-11472 filed in Rep. of Korea on Mar. 6, 2001, herein incorporated by reference.

BACKGROUND OF THE INVENTION

1. Field of the Invention

The present invention relates to a method for manufacturing a flat fluorescent lamp, and more particularly, to a method for manufacturing a flat fluorescent lamp in which formation of a fluorescent layer is more efficient.

2. Description of the Related Art

Flat panel displays are roughly divided into a light emitting type such as cathode ray tubes (CRTs), electroluminescent (EL) devices, plasma display panels (PDPs), and a light receiving type such as liquid crystal displays (LCDs). LCDs need an additional light source, for example a backlight, to display images because liquid crystal itself cannot emit light.

A typical back lighting arrangement for LCDs employs cold cathode fluorescent lamps (CCFLs) or flat fluorescent lamps with a fluorescent layer deposited on a plate. The back lighting arrangement of CCFLs is also divided into an edge-light type in which CCFLs are stacked at sides of the lamp and light from the CCFLs are guided to entire lamp surface by a light guiding plate, and a direct-light type in which CCFLs are placed directly under the front plate of the back light.

A CCFL is constructed by connecting a plurality of fluorescent lamps in parallel on a plate and is operated with the application of alternating current (AC) voltage. The plurality of fluorescent lamps need separate connections to a power source for selective emission to display a particular image. Edge-light type CCFLs are incompatible with large-sized panels because light is emitted from only one edge therein. For these reasons, the need for LCD back lighting with flat fluorescent lamps is increasing.

FIG. 1 is a perspective view showing the structure of a conventional flat fluorescent lamp. Referring to FIG. 1, the conventional flat fluorescent lamp includes a front plate 11 and a back plate 12 arranged to face the front plate 11. A fluorescent layer 13 is deposited on the bottom of the front plate 11. A series of discharging electrodes are arranged on the top of the back plate 12 with a predetermined separation gap, and a dielectric layer 15 is formed covering the discharging electrodes 14. A reflective layer 16 is formed on the dielectric layer 15, and another fluorescent layer 18 is formed on the reflective layer 16. In addition, the conventional flat fluorescent lamp includes spacers (not shown) providing a gap between the front plate 11 and the back plate 12 and a discharge gas injected into a sealed space between the front plate 12 and the back plate 12.

In the conventional flat fluorescent lamp having the configuration described above, as power is applied to the discharging electrodes 14, the LCD screen is irradiated with light generated by exciting the fluorescent layers 13 and 18 with ultraviolet (UV) light generated by discharge gas. In particular, the fluorescent layer 18 formed on the back plate 12 of the flat fluorescent lamp not only serves to convert the UV light generated through gas discharge into visible light but also prevents luminance loss by blocking visible light transmission through the bottom of the back plate 12. The fluorescent layer 18 formed on the back plate 12 of the flat fluorescent lamp should be as thick as 100–120 $\mu$m.

A screen printing method is widely used as a fluorescent layer formation method for the conventional flat fluorescent lamp. A single screen printing produces a layer having a thickness of 7–10 $\mu$m that is not thick enough as a fluorescent layer for the flat fluorescent lamp. As another drawback of the screen printing method, application of the screen printing method is limited to only a uniform print surface or a particular pattern. In general, formation of the florescent layer 18 on the back substrate 12 follows spacer formation. Therefore, there is a difficulty in applying the screen printing method to form a fluorescent layer covering protruding spacers on a back plate.

In the screen printing method, phosphor to be deposited on a plate is prepared as paste mixed with a large amount of an organic binder. Here, the large amount of the organic binder may cause a problem of outgassing because it remains after packaging of the display device.

As another approach to forming a fluorescent layer, U.S. Pat. No. 5,509,841 discloses flowing of slurry from one end of a plate with partitioned paths. However, this method is not suitable to form a uniform, thick fluorescent layer on a larger plate.

SUMMARY OF THE INVENTION

To solve the above-described problems, it is an object of the present invention to provide a method for manufacturing a flat fluorescent lamp in which a fluorescent layer can be formed to a sufficient thickness with easy thickness control, and phosphor can be deposited with less organic binder.

To achieve the object of the present invention, there is provided a method for manufacturing a flat fluorescent lamp, the method comprising: preparing a transparent front plate; preparing a transparent back plate facing the front plate, the back plate having a plurality of discharging electrodes thereon and a dielectric layer covering the discharging electrodes; forming a plurality of spacers between the front plate and the back plate to keep a separation gap therebetween; and forming a fluorescent layer by spraying phosphor slurry on one surface of at least one of the front plate and the back plate.

It is preferable that the phosphor slurry contains 40–60% by weight phosphor based on the total weight of the phosphor slurry. If the content of the phosphor is less than 40% by weight, a longer spraying time is required to obtain a fluorescent layer having a target thickness, and the phosphor slurry has a low viscosity, thereby causing a slurry flow off of the plate. In other words, efficient formation of a thick fluorescent layer is difficult. In contrast, if the content of the phosphor exceeds 60% by weight, it is not easy to supply the phosphor slurry through a pipeline into a spray equipment due to increased viscosity of the phosphor slurry.

It is preferable that the phosphor slurry contains 1–5% by weight an organic binder based on the total weight of the phosphor slurry. If the content of the organic binder is less than 1% by weight, adhesion of the phosphor to the plate is reduced. If the content of the organic binder exceeds 5% by weight, a problem of outgassing would occur as a result of organic binder remaining after device packaging.

Preferably, the organic binder comprises at least one selected from the group consisting of ethylcellulose and nitrocellulose. Preferably, the solvent comprises at least one selected from the group consisting of ethanol, terpineol, and 2-(2-butoxyethoxy)ethylacetate (BCA). Preferably, a mixture of ethanol and terpineol used as the solvent has a mixing ratio of 3:1 by weight.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

A method for manufacturing a flat fluorescent lamp according to the present invention will be described in greater detail by means of the following example. The following example is for illustrative purposes and is not intended to limit the scope of the invention.

EXAMPLE

A phosphor slurry was prepared by mixing 50 g of white phosphor, a mixture of red phosphor, green phosphor, and blue phosphor, 100 g of a solvent mixture containing ethanol and α-terpineol in a weight ratio of 3:1, and 4 g of ethylcellulose (EC) in a mixer.

A back plate with discharge electrodes, a dielectric layer, and spacers were prepared. A spray gun was installed 1 m above the center of the back plate. The prepared phosphor slurry was supplied into the spray equipment at 40° C. through a pipeline and sprayed over the back plate to form a fluorescent layer.

Table 1 shows the results of measuring the thickness of the fluorescent layer at four edges (indicated by Sites 1, 2, 3, and 4 in Table 1) and the center (indicated by Site 5) with respect to spraying time.

TABLE 1

| Spraying Time | Thickness of Fluorescent Layer (μm) | | | | |
| --- | --- | --- | --- | --- | --- |
| (sec) | Site 1 | Site 2 | Site 3 | Site 4 | Site 5 |
| 200 | 48 | 40 | 67 | 43 | 61 |
| 400 | 90 | 91 | 100 | 100 | 120 |

As shown in Table 1, according to the present invention, the thickness of the fluorescent layer can easily be controlled to be thick enough for use in a flat fluorescent lamp by adjusting spraying time.

Table 2 comparatively shows the luminance characteristic of a fluorescent layer formed by the conventional screen printing method and the fluorescent layer of the above Example formed by the spraying method according to the present invention.

TABLE 2

| | Color Coordinate, CIE (x, y) | | Luminance |
| --- | --- | --- | --- |
| Method | Before Fluorescent Layer Formation | After Fluorescent Layer Formation | Reduction Ratio |
| Screen Print (Conventional) | (0.29, 0.34) | (0.30, 0.38) | 7% |
| Spray (Present Invention) | (0.29, 0.34) | (0.28, 0.35) | 2% |

As shown in Table, 1, when a fluorescent layer is formed by the conventional screen printing method, the luminance of a display device is reduced by 7% after the deposition of the fluorescent layer. In contrast, the spraying method according to the present invention leads to a luminance reduction of no more than 2%. This smaller luminance reduction is considered as a result of use of a small amount of organic binder. The properties of the fluorescent layer such as color coordinate and luminance are less affected by decomposition of the organic binder during sintering.

Figure 1:
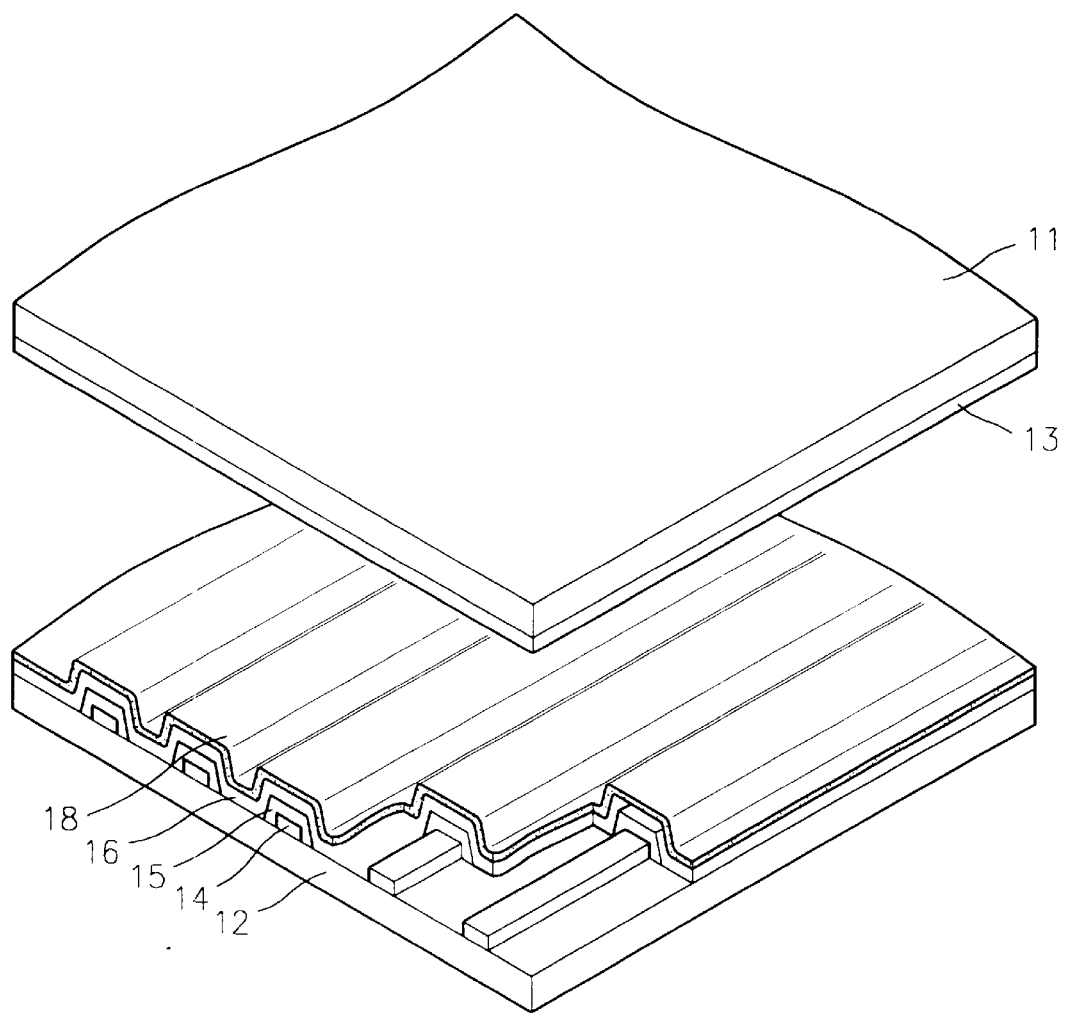
FIG. 1 is a perspective view showing the structure of a conventional flat fluorescent lamp.
Figure 2:
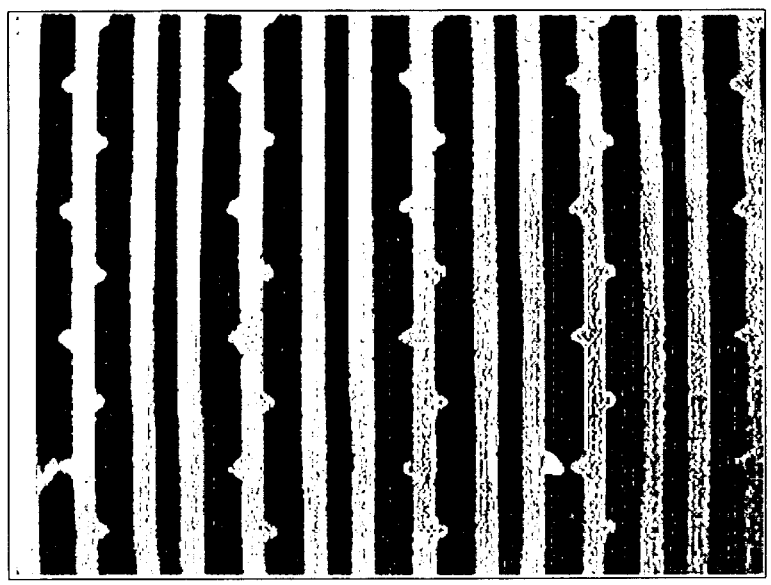
FIG. 2 is a photo of a back plate with spacers before being subjected to phosphor slurry spray in Example according to the present invention.
Figure 3:
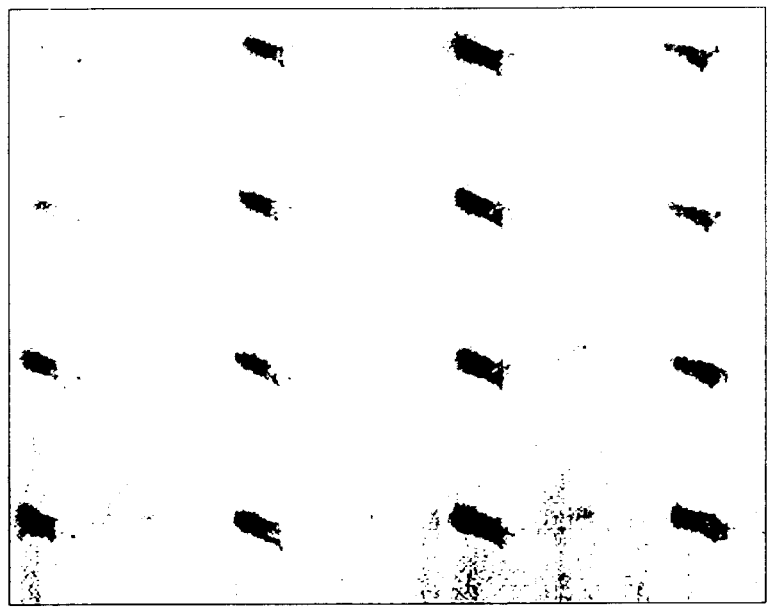
FIG. 3 is a photo of the back plate with spaces of FIG. 2 after phosphor slurry spraying in Example according to the present invention.

FIGS. 2 and 3 are actual size and twofold size photos of the back plate with spacers of the above Example before and after being sprayed with phosphor slurry, respectively. As shown in FIGS. 2 and 3, the fluorescent layer can be deposited on the back plate by the spray method according to the present invention even with protruding spacers.

As described above, the method for manufacturing a flat fluorescent lamp according to the present invention enables easy thickness control of a fluorescent layer through adjustment of phosphor slurry spraying time. Therefore, a 100 μm or thicker fluorescent layer can easily be formed by the method according to the present invention. The present invention advantageously has wide applications irrespective of the structure or surface unevenness of plates. In addition, the method according to the present invention uses less organic binder in a phosphor slurry compared to the screen printing method, and thus sintering of the fluorescent layer, which is usually performed before device packaging, is unnecessary, thereby simplifying the manufacturing process and reducing the problem of outgassing.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method for manufacturing a flat fluorescent lamp, the method comprising:

preparing a transparent front plate;

preparing a transparent back plate facing the front plate, the back plate having a plurality of discharging electrodes thereon and a dielectric layer covering the discharging electrodes;

forming a plurality of spacers between the front plate and the back plate to keep a separation gap therebetween; and forming a fluorescent layer by spraying a phosphor slurry on one surface of at least one of the front plate and the back plate;

wherein the phosphor slurry comprises a solvent, a phosphor and an organic binder, the phosphor being present in the phosphor slurry in an amount of 40–60% by weight based on the total weight of the phosphor slurry and the organic binder being present in the phosphor slurry in an amount of 1–5% by weight based on the total weight of the phosphor slurry.

2. The method of claim 1, wherein the organic binder comprises at least one selected from the group consisting of ethylcellulose and nitrocellulose.

3. The method of claim 1, wherein the solvent comprises at least one selected from the group consisting of ethanol, terpineol, and 2-(2-butoxyethoxy)ethylacetate.

4. The method of claim 3, wherein a mixture of ethanol and terpineol used as the solvent has a mixing ratio of 3:1 by weight.

* * * * *